(12) United States Patent
Kahtava et al.

(10) Patent No.: US 10,349,306 B2
(45) Date of Patent: Jul. 9, 2019

(54) CONGESTION AVOIDANCE IN A NETWORK WITH BASE STATION AND RELAY NODES

(71) Applicant: Sony Corporation, Tokyo (JP)

(72) Inventors: Jussi Tapani Kahtava, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 49 days.

(21) Appl. No.: 15/557,515

(22) PCT Filed: Mar. 8, 2016

(86) PCT No.: PCT/EP2016/054934
§ 371 (c)(1),
(2) Date: Sep. 12, 2017

(87) PCT Pub. No.: WO2016/155991
PCT Pub. Date: Oct. 6, 2016

(65) Prior Publication Data
US 2018/0054756 A1    Feb. 22, 2018

(30) Foreign Application Priority Data
Mar. 31, 2015   (EP) .................................... 15161933

(51) Int. Cl.
*H04W 28/02*    (2009.01)
*H04W 40/22*    (2009.01)
(Continued)

(52) U.S. Cl.
CPC ......... *H04W 28/0278* (2013.01); *H04L 45/22* (2013.01); *H04L 47/122* (2013.01);
(Continued)

(58) Field of Classification Search
CPC ......... H04W 28/0278; H04W 28/0284; H04W 28/0236; H04W 28/0289; H04W 28/08;
(Continued)

(56) References Cited

U.S. PATENT DOCUMENTS

2003/0149785 A1* 8/2003 Gerla ...................... H04L 29/06
                                                                709/232
2003/0179704 A1    9/2003 Lakkakorpi
(Continued)

FOREIGN PATENT DOCUMENTS

EP         1347603 A1    9/2003
EP         2109336 A1   10/2009
(Continued)

OTHER PUBLICATIONS

International Search Report dated Jul. 19, 2016, in PCT/EP2016/054934, filed Mar. 8, 2016.
(Continued)

*Primary Examiner* — Ajay Cattungal
(74) *Attorney, Agent, or Firm* — Xsensus LLP

(57) ABSTRACT

A method of reducing congestion in a mobile telecommunications system, the system comprising a plurality of mobile terminals, one or more relay nodes and a base station, the mobile terminals, relay nodes and base station being configured to communicate via a wireless interface. The method comprises determining first path information indicating one or more paths for transmitting data from the plurality of mobile terminals to the base station, wherein a path comprises a series of one or more edges, the series of edges being from one or more mobile terminals to the base station, directly or via one or more relay nodes; estimating, based on the first path information, a congestion likelihood for a first relay node to cause congestion for data transmission in the system; and if the estimated congestion likeli-
(Continued)

hood for the first relay node is above a first threshold, determining second path information so as to reduce the congestion likelihood for the first relay node.

17 Claims, 9 Drawing Sheets

(51) Int. Cl.
    *H04L 12/707*     (2013.01)
    *H04L 12/803*     (2013.01)
    *H04L 12/911*     (2013.01)
    *H04W 28/08*     (2009.01)

(52) U.S. Cl.
    CPC ......... *H04L 47/823* (2013.01); *H04W 28/021* (2013.01); *H04W 28/0236* (2013.01); *H04W 28/0284* (2013.01); *H04W 28/0289* (2013.01); *H04W 40/22* (2013.01); *H04W 28/08* (2013.01)

(58) Field of Classification Search
    CPC .... H04W 28/021; H04W 40/22; H04L 45/22; H04L 47/122; H04L 47/823
    See application file for complete search history.

(56) References Cited

U.S. PATENT DOCUMENTS

| | | | |
|---|---|---|---|
| 2004/0156345 A1* | 8/2004 | Steer | H04L 45/12 370/338 |
| 2004/0228276 A1* | 11/2004 | Courtney | H04L 47/14 370/230 |
| 2009/0232001 A1 | 9/2009 | Gong et al. | |
| 2011/0038264 A1* | 2/2011 | Ishii | H04L 47/10 370/238 |
| 2011/0044169 A1 | 2/2011 | Liu | |
| 2011/0069750 A1* | 3/2011 | Chengalvala | H04N 19/42 375/240.02 |
| 2012/0176900 A1 | 7/2012 | Steer et al. | |
| 2013/0070603 A1 | 3/2013 | Sahaly et al. | |
| 2014/0215077 A1* | 7/2014 | Soudan | H04L 47/11 709/226 |
| 2014/0304425 A1* | 10/2014 | Taneja | H04L 47/12 709/235 |
| 2015/0063295 A1* | 3/2015 | Himayat | H04W 36/0022 370/331 |
| 2015/0163809 A1* | 6/2015 | Inaida | H04W 72/1252 370/230 |

FOREIGN PATENT DOCUMENTS

| | | |
|---|---|---|
| WO | 2016/102441 A1 | 6/2016 |
| WO | 2016/116289 A1 | 7/2016 |
| WO | 2016/135082 A1 | 9/2016 |
| WO | 2016/155953 A1 | 10/2016 |

OTHER PUBLICATIONS

Holma et al.. "LTE for UMTS OFDMA and SC-FDMA Based Radio Access", Jan. 2010, 4 pages.

"3rd Generation Partnership Project; Technical Specification Group Radio Access Network; Small cell enhancements for E-UTRA and E-UTRAN—Physical layer aspects (Release 12)", 3GPP TR 36.872 V12.1.0, Dec. 2013, 100 pages.

* cited by examiner

CONGESTION AVOIDANCE IN A NETWORK WITH BASE STATION AND RELAY NODES

CROSS-REFERENCE TO RELATED APPLICATIONS

This application is a National Stage of International Application No. PCT/EP2016/054934, filed Mar. 8, 2016, which claims priority to European Patent Application 15 161 933.5, filed in the European Patent Office on Mar. 31, 2015, the entire contents of which being incorporated herein by reference.

TECHNICAL FIELD OF THE DISCLOSURE

The present disclosure relates to methods, base station, and relay node, and more broadly to arrangements for congestion control in a mobile telecommunications system.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a number of new infrastructure architectures involving a variety of class of devices, of wireless access point units and of applications which may be target to different data rates, coverage areas or transmission powers. Unlike a conventional third or fourth generation communications device such as a smartphone, an MTC-type terminal is preferably relatively simple and inexpensive, having a reduced capability. Examples of recent developments include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Other examples include relay nodes which provide assistance to local terminal communicating with a base station.

US 2009/0232001 discusses congestion control in wireless mesh networks. A node monitors its incoming queues and selects a congestion control method accordingly and fails to disclose a method for trying to reduce congestion before it occurs.

Whilst it can be convenient to have different systems addressing different needs from different mobile network users, the additions of new infrastructure and new services can also create an infrastructure problem, which is not desirable in a mobile network.

SUMMARY OF THE DISCLOSURE

According to an example embodiment of the present technique there is provided a method of reducing congestion in a mobile telecommunications system, the system comprising a plurality of mobile terminals, one or more relay nodes and a base station, the mobile terminals, relay nodes and base station being configured to communicate via a wireless interface. The method comprises determining first path information indicating one or more paths for transmitting data from the plurality of mobile terminals to the base station, wherein a path comprises a series of one or more edges, the series of edges being from one or more mobile terminals to the base station, directly or via one or more relay nodes; estimating, based on the first path information, a congestion likelihood for a first relay node to cause congestion for data transmission in the system; and if the estimated congestion likelihood for the first relay node is above a first threshold, determining second path information so as to reduce the congestion likelihood for the first relay node.

According to another aspect of the present invention, there is provided a base station for reducing congestion in a mobile telecommunications system, the system comprising a plurality of mobile terminals, one or more relay nodes and a base station, the mobile terminals, relay nodes and base station being configured to communicate via a wireless interface. The base station is configured to: determine first path information indicating one or more paths for transmitting data from the plurality of mobile terminals to the base station, wherein a path comprises a series of one or more edges, the series of edges being from one or more mobile terminals to the base station, directly or via one or more relay nodes; estimate, based on the first path information, a congestion likelihood for a first relay node to cause congestion for data transmission in the system; and if the estimated congestion likelihood for the first relay node is above a first threshold, determine second path information so as to reduce the congestion likelihood for the first relay node.

According to a further aspect of the present invention, there is provided circuitry for reducing congestion in a mobile telecommunications system, the system comprising a plurality of mobile terminals, one or more relay nodes and a base station, the mobile terminals, relay nodes and base station being configured to communicate via a wireless interface. The circuitry comprises a controller element and a transceiver element configured to operate together to: determine first path information indicating one or more paths for transmitting data from the plurality of mobile terminals to the base station, wherein a path comprises a series of one or more edges, the series of edges being from one or more mobile terminals to the base station, directly or via one or more relay nodes; estimate, based on the first path information, a congestion likelihood for a first relay node to cause congestion for data transmission in the system; and if the estimated congestion likelihood for the first relay node is above a first threshold, determine second path information so as to reduce the congestion likelihood for the first relay node.

According to yet another aspect of the present invention, there is provided a relay node for reducing congestion in a mobile telecommunications system, the system comprising a plurality of mobile terminals, one or more relay nodes and a base station, the mobile terminals, relay nodes and base station being configured to communicate via a wireless interface. The relay node is configured to: determine that a first buffer of the relay has a saturation level above a maximum saturation threshold; transmit, upon the determination, a buffer status report indicating that the first buffer has a high saturation level; receive routing information, the routing information providing information for the relay node to route incoming traffic onto an outgoing edge; and route incoming traffic in accordance with the routing information received.

According to a further aspect of the present invention, there is provided circuitry for a relay node for reducing congestion in a mobile telecommunications system, the system comprising a plurality of mobile terminals, one or more relay nodes and a base station, the mobile terminals, relay nodes and base station being configured to communicate via a wireless interface. The circuitry comprises a controller element and a transceiver element configured to operate together to: determine that a first buffer of the relay has a saturation level above a maximum saturation threshold; transmit, upon the determination, a buffer status report indicating that the first buffer has a high saturation level; receive routing information, the routing information providing information for the relay node to route incoming traffic onto an outgoing edge; and route incoming traffic in accordance with the routing information received.

Accordingly, the embodiments of the present technique can provide an arrangement for reducing congestion in a network where data can be relayed by one or more nodes.

Various further aspects and features of the present technique are defined in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
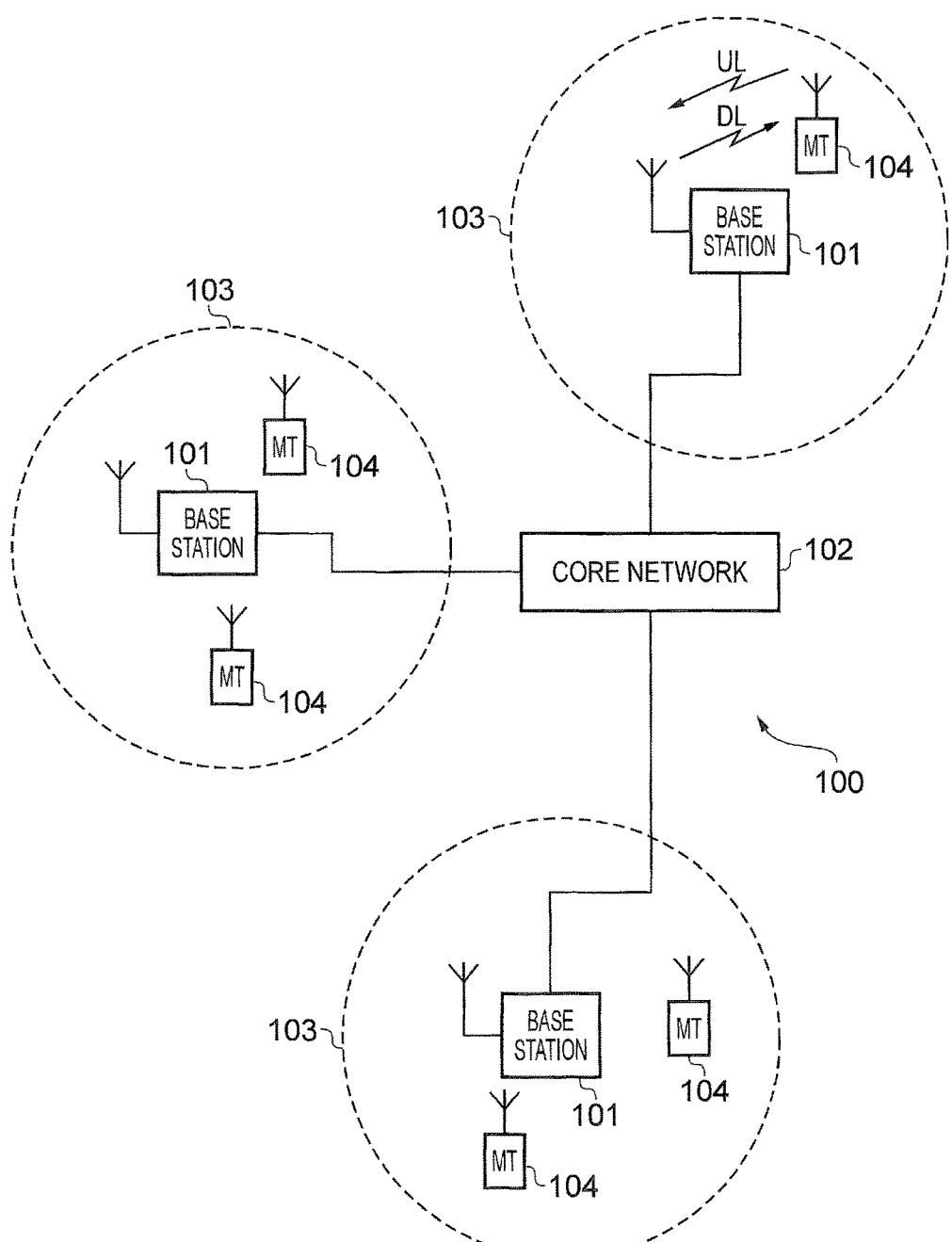
FIG. 1 provides a schematic diagram of a mobile communications system according to an example of an LTE standard.

Hereinafter preferred embodiments of the present technique will be described in detail with reference to the appended drawings. Note that, in this specification and appended drawings, structural elements that have substantially the same function and structure are denoted with the same reference numerals, and repeated explanation of these structural elements is omitted.

FIG. 1 provides a schematic diagram illustrating some basic functionality of a conventional mobile telecommunications network, using for example a 3GPP defined UMTS and/or Long Term Evolution (LTE) architecture. The mobile telecommunications network/system 100 of FIG. 1 operates in accordance with LTE principles and which may be adapted to implement embodiments of the disclosure as described further below. Various elements of FIG. 1 and their respective modes of operation are well-known and defined in the relevant standards administered by the 3GPP®body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that are licenced for use by the operator of the network 100. The core network 102 routes data to and from the terminal devices 104 via the respective base stations 101 and provides functions such as authentication, mobility management, charging and so on. Terminal devices may also be referred to as mobile stations, user equipment (UE), user terminal, mobile terminal, mobile device, terminal, mobile radio, and so forth. Base stations may also be referred to as transceiver stations/nodeBs/e-nodeBs/eNodeB, eNB, and so forth.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

The base stations 101 of FIG. 1 may be realised as any type of evolved Node B (eNodeB) such as a macro eNodeB and a small eNodeB. The small eNodeB may be an eNodeB such as a pico eNodeB, a micro eNodeB, and a home (femto) eNodeB that covers a cell smaller than a macro cell. Instead, the base station 101 may be realized as any other types of base stations such as a NodeB and a base transceiver station (BTS). The base station 101 may include a main body (that is also referred to as a base station apparatus) configured to control radio communication, and one or more remote radio heads (RRH) disposed in a different place from the main body. In addition, various types of terminals, which will be described below, may each operate as the base station 101 by temporarily or semi-persistently executing a base station function.

Any of the communications devices 104 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The communications device 104 may also be realized as a terminal (that is also referred to as a machine type communication (MTC) terminal) that performs machine-to-machine (M2M) communication. Furthermore, the terminal apparatus 104 may be a radio communication module (such as an integrated circuit module including a single die) mounted on each of the terminals In the present disclosure, a base station providing a small cell is generally differentiated from a conventional base station mostly (and sometimes exclusively) in the range provided by the base station. Small cells include for example the cells also called femtocell, picocell or microcell. In other words, small cells can be considered as similar to macrocells in the channels and features provided to the terminals, but with the use of less power for base station transmissions, which results in a smaller range. A small can therefore be the cell or coverage provided by a small cell base station. In other examples, the term small cell can also refer to a component carrier when more than one component carriers are available.

Moreover, mobile networks can also include Relay Nodes (RN) which can further increase the complexity of the mobile system and of the reduction of interference in a small cell network. Relay technologies are known generally to provide an arrangement for receiving signals from a base station and for retransmitting the received signals to a UE in a mobile communications network, or to receive signals transmitted from a UE for re-transmission to a base station of a mobile communications network. The aim of such relay nodes is to try to extend a radio coverage area provided by a mobile communications network to reach communications devices which would otherwise be out of range of the mobile communications network or to improve the ratio of successful transmissions between a terminal and a base station.

A mobile network which includes a variety of base stations and/or relay nodes (e.g. macro-cell base stations, small cell base stations and/or relays) is sometimes referred to as a heterogeneous network.

Heterogeneous networks that would have very dense footprint of access points will no longer be designed and set up in a coordinated fashion by a single mobile network operator. Due to the sheer number of small cells needed their installation will happen much more in an ad hoc fashion, with end users and other non-MNO entities also installing small cells. The overall network management would still be done by an operator for all small cells using that MNO's assigned frequency band. This evolution from today's operator installed networks to more unplanned ad hoc networks is what we refer to as 'dense network' in this description.

Figure 2:
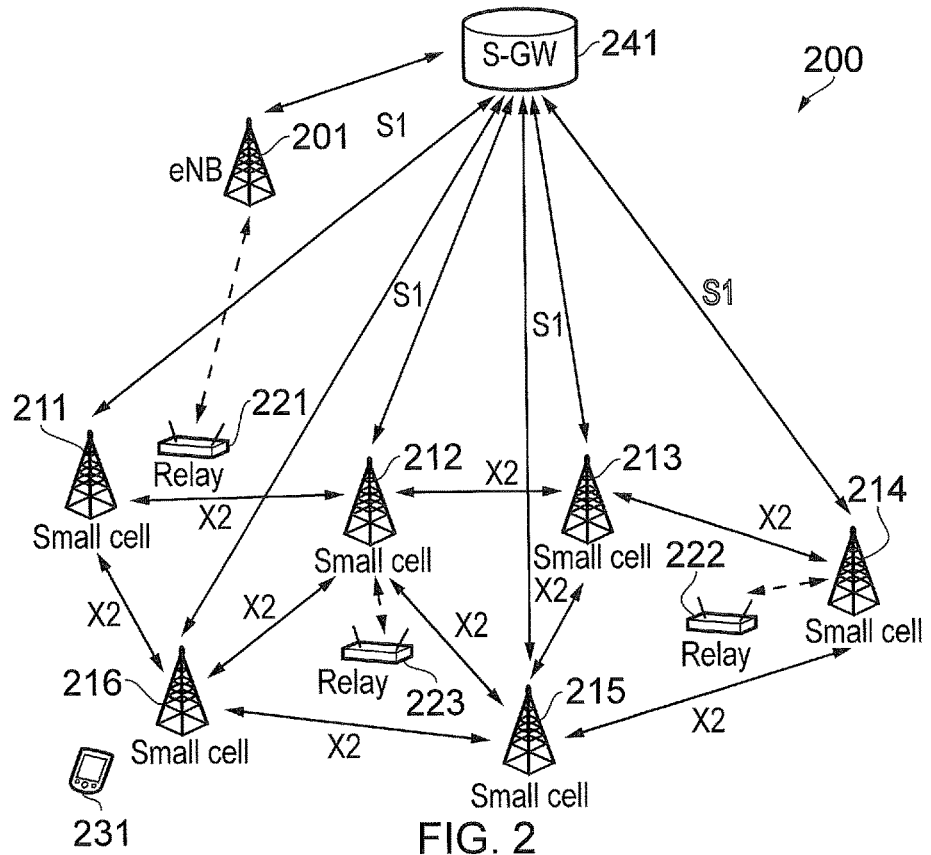
FIG. 2 illustrate an example system for communicating with at least a terminal in a heterogeneous network.

FIG. 2 illustrates an example heterogeneous system 200 for communicating with at least a terminal 231. In this system 200, a base station 201 provides a macrocell and six base stations 211-216 provide small cell coverage, potentially overlapping with the coverage of the base station 201. Additionally, three RN 221-223 are provided and are operating with base stations 201, 214 and 212, respectively. A relay node can generally be defined as a wireless radio access point for relaying transmission and which thus does not implement all of the functionalities of a base station. It is in general not directly connected to the core network but uses wireless access (inband or outband) for backhaul link to connect with a base station. In other examples, the backhaul link may also be provided over a wired connection. This is in contrast to a small cell base station which, as mentioned above, can generally operate like a base station and is thus connected to the core network, as illustrated by the arrows between the small cell base stations 211-216 and the Serving Gateway "S-GW" in FIG. 2. Relay nodes may also send or receive data with the terminals or base stations which can also add to the complexity of dealing with interference in an environment as illustrated in FIG. 2.

Figure 3:
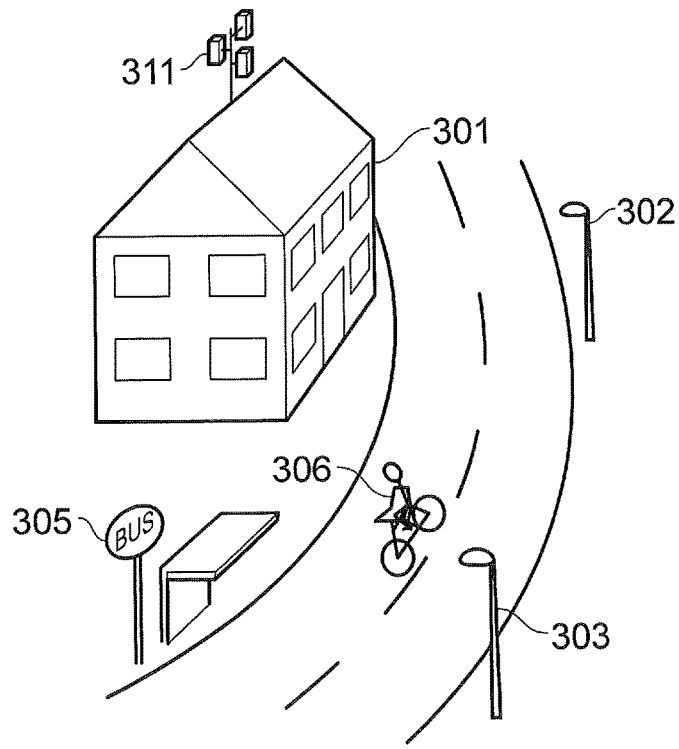
FIG. 3 illustrates an example of a heterogeneous environment.

Another example of a heterogeneous environment is illustrated in FIG. 3, where a macrocell base station 311 is provided in the same area as small cells provided by a base station 301 in or in the vicinity of a building, by a base station 302 in a first lamppost, by a base station 303 in a second lamppost, by a base station 305 provided in a bus stop and by a mobile base station 306 provided in a cyclist back-pack. In another example, the infrastructure unit 303 and 302 in lamp posts may be relay nodes relaying data in the uplink and/or downlink to the macrocell base station 311 or to another infrastructure unit (e.g. another relay node). In this example, the interference and link quality experience can vary greatly depending on traffic and on time: the cyclist may enter an interference/poor link quality zone and later leave this are, while the base station 301, if associated with an office, may potentially only be used during office hours and may be turned off during the rest of the day or the rest of the week.

In such a heterogeneous network, a terminal may be able to communicate via a plurality of wireless links which can each have different qualities. However, conventional link measurements are only provided for the base station providing the cell on which the terminal is camping. For example, if a terminal is connected to a base station 201, 211 or 311, the terminal will measure and report link quality for the link between the terminal and this base station. When contemplating a handover, the terminal may report on a neighbouring base station but remains unable to report on link quality for other infrastructure unit within the cell it is currently camping on. Additionally, a base station can be detected by a terminal using conventional cell detection mechanism, using signals provided by the base station. The terminal can also measure the strength and/or quality of the link with the base station using these signals, for example when selecting a cell. On the other hand, other infrastructure units, such as relay nodes, do not act as a base station and can therefore not provide these signals. As a result, the terminal finds itself unable to detect, or measure links with, relay nodes. It is therefore desirable to address this problem.

Figure 4:
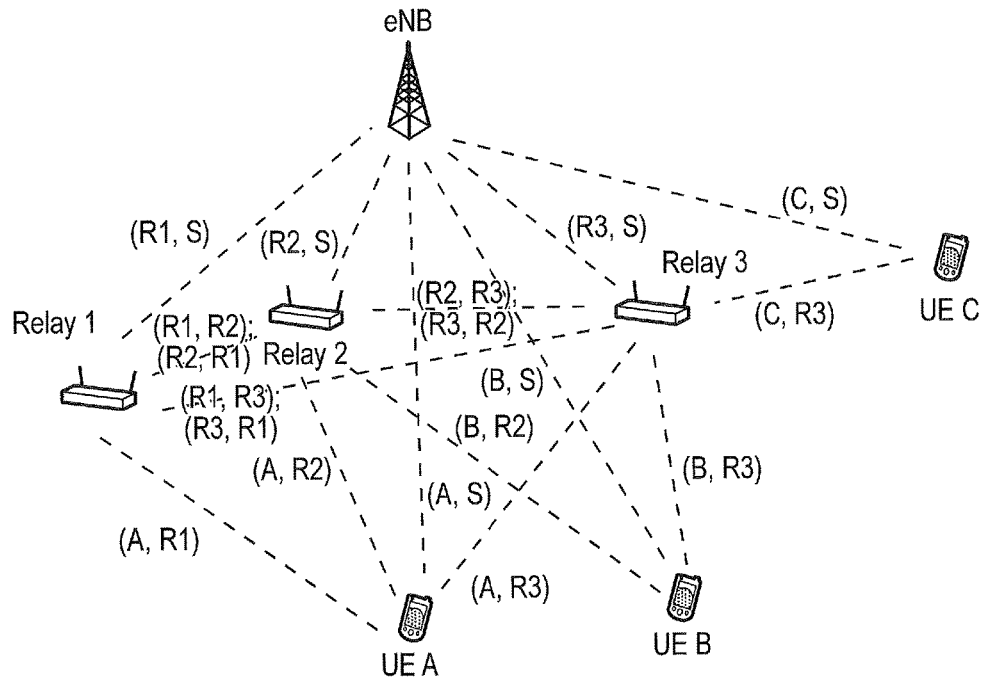
FIG. 4 provides a schematic illustration of a heterogeneous network.

FIG. 4 provides a schematic illustration of a heterogeneous network showing the variety of links that can be established between two elements of the groups formed of the terminals and the infrastructure units (base stations and relay nodes). This group includes here one base station (eNB); three relays Relay 1 or R1, Relay 2 or R2 and Relay 3 or R3; and three terminals UE A, UE B and UE C. The topology of the network can be seen or represented as a directed graph G which consists of a vertex set V and an edge set E, i.e. G=(V,E). The vertices are here one of a terminal or an infrastructure unit and the edges are directed edges corresponding to a communication link between two vertices. As an illustration, in the example of FIG. 4, R1 and R2 (two vertices) have a bi-directional communication link. That is, two directed communication links are in fact provided, one from R1 to R2 and one from R2 to R1. This has been represented in FIG. 4 with "(R1, R2)" which denotes the first edge and "(R2, R1)" which denotes the other edge. The head and tail of an edge e=(v',v) is denoted by v=head (e) and v'=tail(e). For example, tail(R1,R2)=R1 and head (R1,R2)=R2. Using such a graph terminology, calculations can be made to establish what is considered as the best or suitable route between a source and a sink (destination). For example, a route calculation module may determine that the best uplink route from UE A, B and C to the eNB are "A-R1-R2-eNB", "B-R3-R2-eNB" and "C-R3-eNB", respectively. While algorithms for calculating optimal routes in a graph are useful for identify the theoretically most appropriate route or routes, it can sometimes result in route and traffic distribution that can lead to problems in practice. In particular, as the amount of traffic that will effectively be received and/or sent by each of the UEs, relay nodes and base stations is difficult to anticipate, the practical application of a theoretical optimal route may not be as useful as expected. The route calculation may in some examples be based on one or more measurements in respect of possible edges in the network such that an element (in some examples the or co-located with the base station) can build a view of the link quality for as many links as possible within the network where this link quality information can be used to determine possible routing information or path information.

Figure 5:
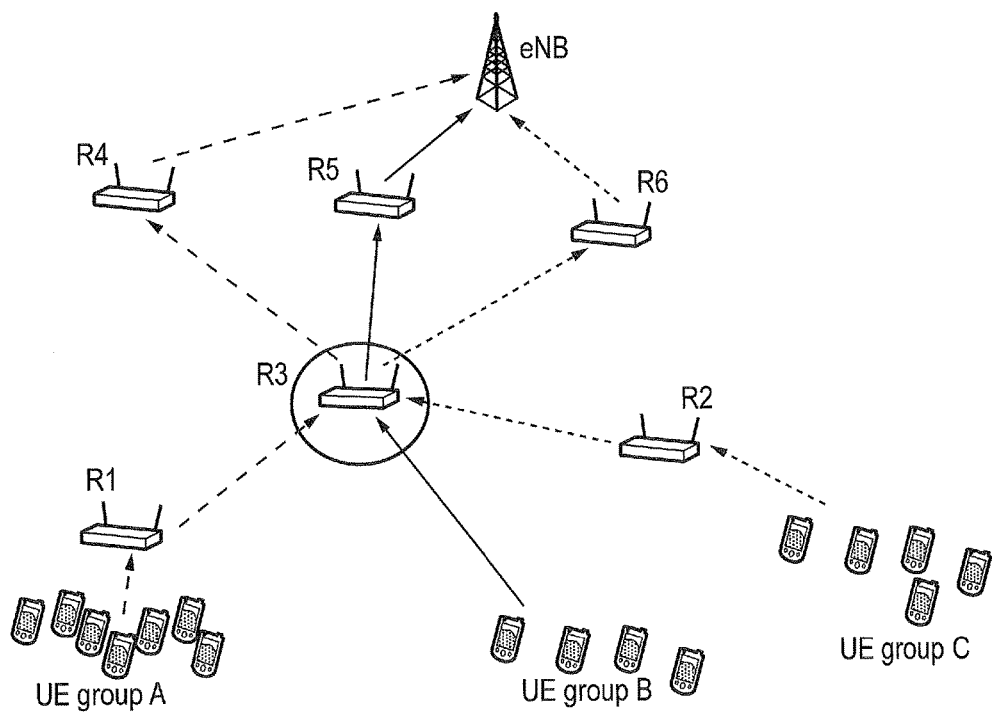
FIG. 5 provides a schematic illustration of another heterogeneous network.

FIG. 5 provides a schematic illustration of another heterogeneous network where an example of uplink traffic routes has been represented. The routing of traffic in the network illustrated in FIG. 5 may be the outcome of any suitable determination of path information for routing data from mobile terminals to the base station. Different algorithms may be used to try to identify the best path or a desirable path. One example algorithm is the Ford-Fulkerson algorithm which, at a recurrence level, recursively attempts to identify any possible path from the source (e.g. mobile terminal or base station) to the sink (e.g. base station or mobile terminal) in the residual network which is based on the original network (or graph) and on the previously identified paths. Regardless of the method used to arrive at the example of FIG. 5, in this example, UE from group A have their traffic routed via three relay nodes R1, R3 and R4, UEs from group B have their traffic routed via two relay nodes R3 and R5 and UEs from group C have their traffic routed via three relay nodes R2, R3 and R6. While this may be considered as a suitable or even optimal traffic distribution within this network, this distribution has created a bottleneck at relay R3 (circled) as all uplink traffic goes through R3. That is, several edges from other nodes (relay or mobile terminals) converge at one relay node. The reception of a large amount of signals from the incoming edges within a time period may overload the relay node input buffer, or alternatively the throughput in the overall relay network suffers from scheduling delays across such congestion point. Likewise, the forwarding of a large amount of signals across multiple outgoing edges (for example from R3 to R4-R6 in FIG. 5) during a time period may also cause delay and/or buffer overflow at the node. It may also be difficult to attempt to do several transmissions simultaneously due to the need of maintaining unicast connections to multiple receiving nodes.

Data buffer overflow, when not mitigated, forces a node to flush packets and recovery can only be achieved if a higher layers' protocol provides retransmission mechanisms or if there is a possibility that one or more other routes would provide the lost data to the destination node. Even when these are relied on, they would in turn increase the overall latency for PDUs moving across the relay network. As a result, delays and/or packet loss can be experienced despite the paths being selected as a theoretically suitable option for transmitting signals. To address this type of congestion, the present disclosure provides an arrangement for reducing congestion in a network, wherein the arrangement may be used in a preventive manner, i.e. with a view to reducing congestion before it affects transmissions in the network, or a remedial manner, i.e. with a view to reducing congestion which has already been detected in the network.

Preventive Approach to Congestion Reduction

According to the present disclosure, once path information is obtained for routing data in the network, if it is detected that a relay node is likely to cause congestion in the transmission of data in the network, the path information can be re-generated or updated so as to reduce the likelihood of the relay node causing congestion. For example, starting for an example situation where the example of FIG. 5 represents path information for routing data from the mobile terminals in groups A-C, the likelihood of R3 of causing congestion can be assessed. This assessment can for example based on at least one of a number of incoming edges (3 in this case), a number of outgoing edges (3 in this case) or a number of terminals connected via R3 (16 in this case). In this case, it may be determined that the likelihood of R3 causing congestion is above a threshold such that reducing this likelihood would be expected to reduce congestion in the network. The threshold may be set as appropriate, as discussed further below.

Figure 6:
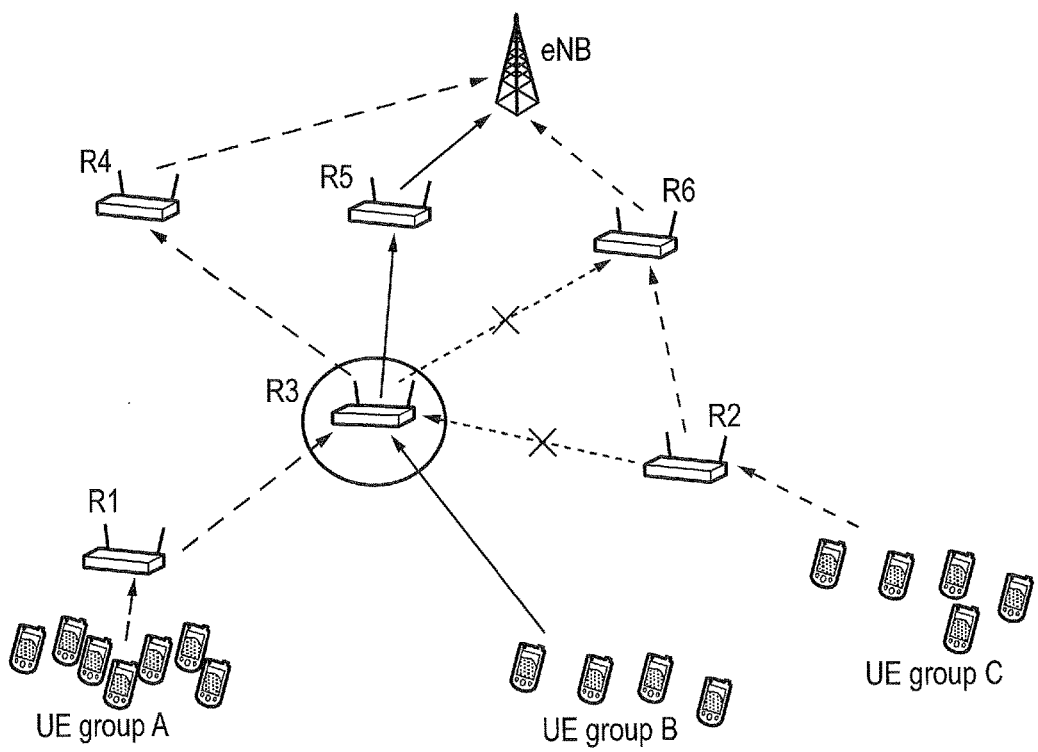
FIG. 6 provides another schematic illustration of another heterogeneous network.

While the path information of FIG. 5 may for example have been obtained using, solely or amongst other things, link capacity in the network for the possible edges within the network (e.g. with a view to getting as close as possible to the theoretical capacity of the network), other criteria may be used additionally or alternatively for calculating new path information for reducing the likelihood of congestion of R3. For example, an alternative path information may be generated which corresponds to the illustration of FIG. 6. In this example, the path for the terminals of group C goes from R2 directly to R6 rather than via R3. While the theoretical link capacity for R2-R3-R6 may be higher than that for R2-R6, by reducing the likelihood of R3 becoming congestion, the terminals of group C—and in the other groups—may in fact enjoy a higher actual capacity for transmitting data.

Starting from first path information (e.g. FIG. 5) and where it has been identified that the congestion likelihood for a relay node (e.g. R3) is greater than a first threshold, it can for example be determined whether, for one or more paths going through the relay node, any alternative paths may be found. The congestion likelihood for the relay node can then be re-estimated for at least one the alternative path and if it is found lower, the alternative path may be used instead. In some examples, all paths going through the relay node will be re-assessed while in other examples only some of these paths will be re-assessed. The latter may help reducing the amount of computing resources required for generating the second path information while the former may assist in result in a more optimised solution compared to the latter. In some examples, the paths going through the congested relay node may be assessed to determine whether they have any suitable alternative paths and once a suitable alternative path is found (which for example makes the congestion likelihood fall below the first threshold or below a lower threshold), it may be used and the alternative path assessment may stop there. In another example, a list of the top N alternative paths may be maintained which includes the alternative paths which help reducing the congestion likelihood the most for the relay node. This list can for example be built and/or maintained until all paths have been assessed so that the best N alternative paths overall can be identified. Alternatively, it can only be built or maintained while only some of the paths are assessed. In one example, once the alternative paths in the list can help reduce the congestion likelihood so that it falls below the first threshold (or below a lower threshold), the alternative paths on the list can be used without assessing for any further alternative paths.

In addition to, or alternatively to, replacing an existing path with an alternative path, one or more path going through the congested node can be removed from the possible paths indicated in the path information. For example, in a case where alternative paths are already available and/or where the transmissions via this path can otherwise be recovered (e.g. using network coding), then the path may be deleted without providing any alternative for it.

In other examples, rather than start with the first path information where a congested node has been detected, the generation of the second path information may only be based on part of the first path information or may not be based on the first path information at all. For example, the second path information may be generated from the beginning, using for example different criteria (e.g. link quality rather than distance) for selecting the paths and/or different parameter values (e.g. reduce the link quality on the edges to and/or from a congested relay node).

When determining whether a relay node is likely to cause congestion, one or more aspects may be considered, for example one or more of the number of incoming edges for the first relay node; the number of outgoing edges for the first relay node; an incoming buffer size for the first relay node (the size of a buffer for incoming traffic); an outgoing buffer size for the first relay node (the size of a buffer for outgoing traffic); a circular buffer size for the first relay node; historical congestion data for the first relay node; historical congestion data for the mobile telecommunications system; and a number of mobile terminals connected to the base station via the first node.

Historical data may for example be used in one or both of (i) the estimation of the likelihood of congestion (e.g. a relay node that has a history of causing congestion may be allocated a higher congestion likelihood than another relay node) and/or in the setting of a threshold for the relay node (e.g. to use a threshold if it is prone to congestion). Also, the historical data may be used to assist in determining which conditions may cause a relay node to become congested. If for example it can be estimated that on average, a first relay node will become congested if it channels traffic for more than 100 terminals, this can be used for estimating the likelihood of congestion. For example, the likelihood of congestion may not increase in a linear fashion with the number of terminals served by the relay node but may increase at a higher rate once this number get closer to or above 100 terminals. Generally, past data on congestion in the network and potentially statistics on past data on congestion in the network may be used when estimating whether a relay node is likely to cause congestion.

Accordingly, by estimating the likelihood for a relay node to cause congestion based on information which can be accessed before congestion occurs or regardless of congestion occurring, and generating new path information which reduces the likelihood of congestion for the relay node, congestion can be reduced in the network. In some examples, based on the new path information, it may be detected that another relay node may be likely to cause congestion and, likewise, further path information can then be generated to address this potential congestion point. In some examples, this procedure may be carried out for more than one iteration, if necessary. Also, if necessary, mechanisms may be put in place with a view to avoiding entering a loop—for example by calculating the new path information each time trying to avoid any relay node which had previously and/or recently been identified as a potential congestion point, by cutting out one or more terminals if no stable solution has been found after a certain number of iteration, or any other suitable method that the skilled person will be able to identify.

Remedial Approach to Congestion Reduction

Likewise, the arrangement of the present disclosure can be used to attempt to reduce congestion in a situation where the congestion is occurring rather than is expected. In some cases, the likelihood of congestion may then be estimated as being very high or can be set to the maximum, if appropriate while in other cases no action may be taken (see for example the non-critical buffer example below).

Figure 7:
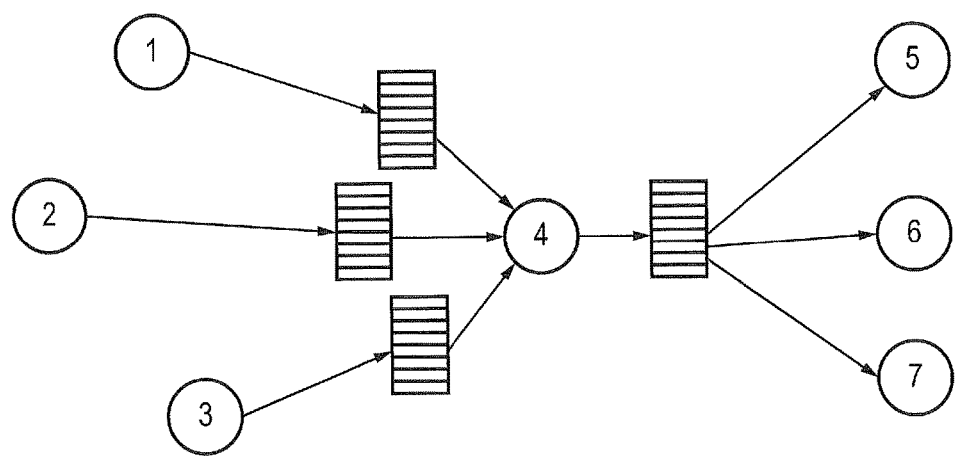
FIG. 7 provides an illustration of a buffer arrangement at a relay node.

Congestion can be detected for example by monitoring the status of one or more buffers of the relay nodes. A first relay and buffer arrangement is illustrated in FIG. 7. In this example, which focuses on a relay node RN4, the relay node has a buffer implementation wherein it uses one buffer for each incoming edge (which may be for one or more terminals) and uses one buffer only for outgoing traffic, regardless of the number of outgoing edges. In other examples, the relay node may use only one buffer for all incoming traffic and/or use one buffer for each outgoing edge. Likewise, any incoming or outgoing traffic buffer may be for an number of edges and may thus in some examples be more than one and less than the number of incoming or outgoing edges, respectively.

Figure 8:
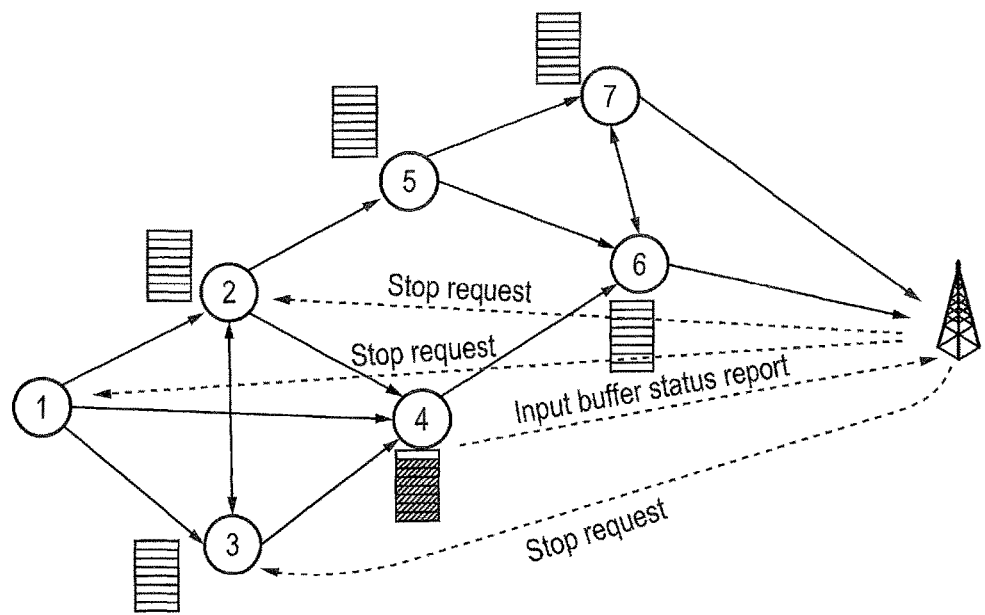
FIG. 8 provides an illustration of a congestion-avoidance mechanism using a buffer status report.
Figure 9:
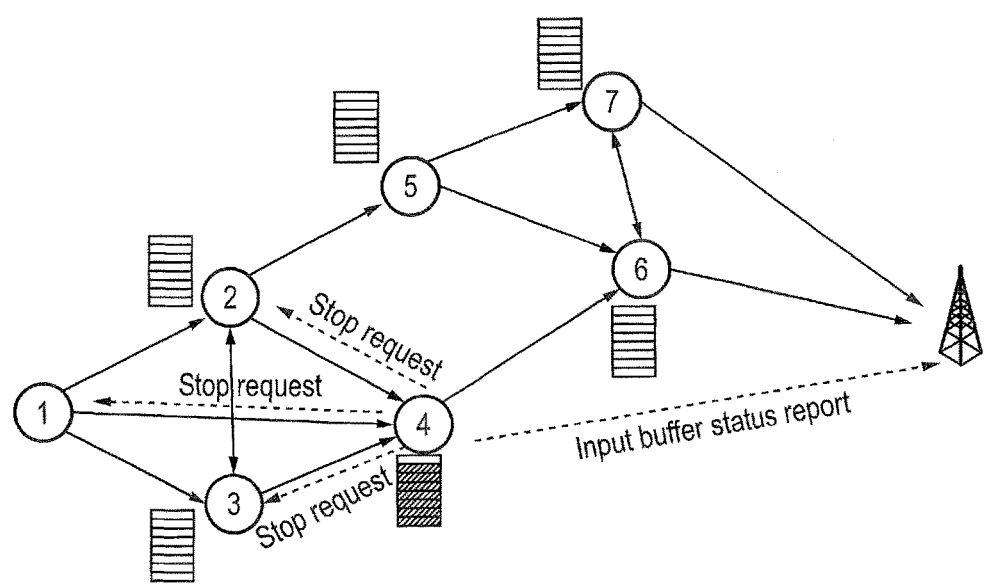
FIG. 9 provides another illustration of a congestion-avoidance mechanism using a buffer status report.
Figure 10:
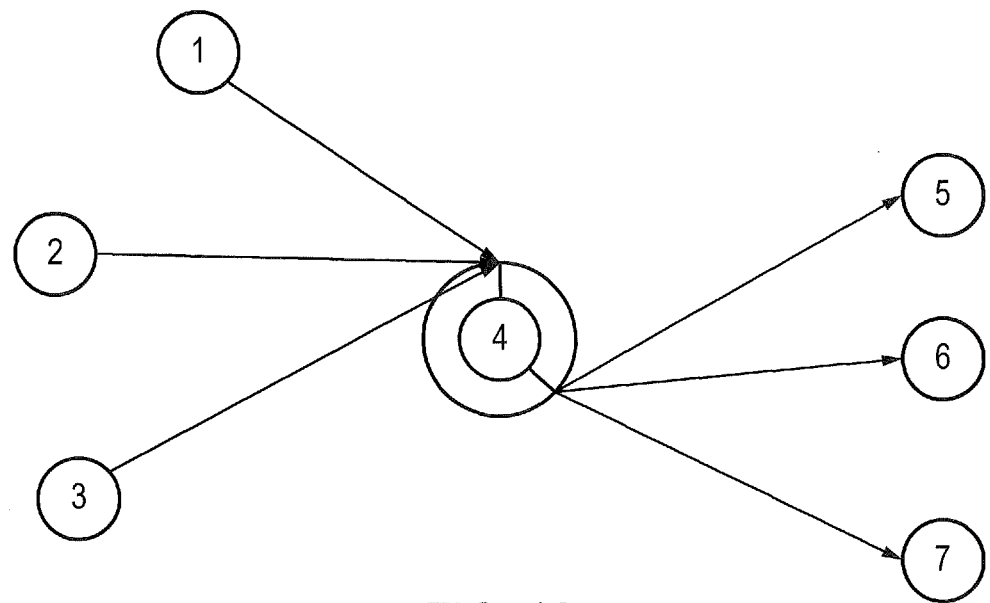
FIG. 10 provides an illustration of another buffer arrangement at a relay node.

FIG. 8 illustrates an example of congestion control when an incoming buffer at RN4 is such that it is likely to cause congestion. In this example, the relay node 4 can detect that its available capacity is low, e.g. below a threshold (in other words that the buffer usage is very high, e.g. above a threshold) and sends a report to the base station indicating the status of its buffer. If appropriate, the base station can then send instructions to other relay nodes to stop transmitting to the relay node and can adjust the path information so as to reduce the likelihood of RN4 facing congestion again. In other examples, for example as illustrated in FIG. 9, the relay node may send the instructions or requests to stop transmitting to the congested relay node and/or mobile terminals having an edge into the congested relay node with a view to addressing the congestion in the short term and, in accordance with the present disclosure, may also send a buffer status report to the base station (or any other suitable element) to report about the relay node being or close to being congested.

The present disclosure applies equally to a situation where, rather than having separate buffers for incoming and outgoing traffic, the relay node uses a circular buffer for both incoming and outgoing traffic. However, the teachings of the present invention apply equally and if the relay node identifies that the pointer for incoming traffic in the buffer is getting too close to the pointer for the outgoing traffic (with only a 10% margin or with a margin lower than a minimum threshold), it can send a buffer status report to report that the relay node is experiencing or close to experiencing congestion. Accordingly, the likelihood for the relay node to cause congestion and/or a threshold for the relay node can be adjusted accordingly, if appropriate.

In accordance with the present disclosure, when one or more buffers are provided in a relay node, a congestion likelihood may be estimated for at least one of these buffers, additionally or alternatively to having a congestion likelihood estimated for the relay node. Also, if a buffer is associated with one edge only, monitoring this buffer at the relay node may help identify which path is causing congestion which may facilitate congestion reduction and the identification of any action that may be necessary and, if appropriate, if any alternative paths may be available for this path causing congestion at the relay node.

Figure 11:
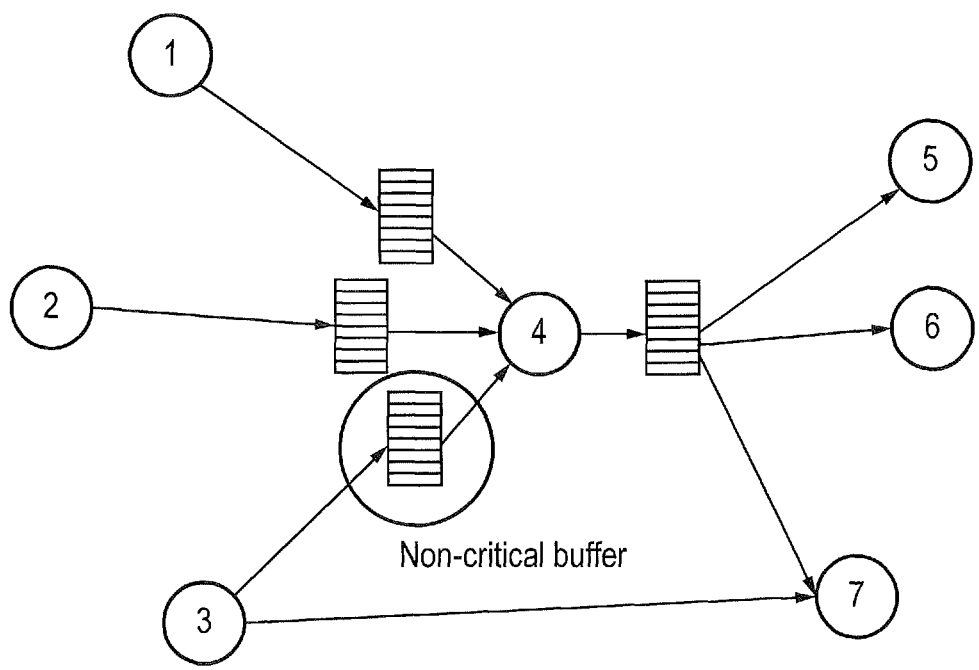
FIG. 11 provides an illustration of a non-critical buffer in the example buffer arrangement of FIG. 7.

FIG. 11 illustrates an example of how the congestion avoidance scheme of the present disclosure can, in some examples, deal with congested buffers which are considered as being non-critical. In the example of FIG. 11, RN4 transmits traffic from RN3 onto RN7 and uses a single buffer per incoming edge and a common buffer for all outgoing edges. Additionally, in this example, an alternative path is available directly from RN3 to RN7. In other words, it is known that two paths are available for traffic from RN3 to RN7. As a result, the buffer circled in FIG. 11 may be categorised as "non-critical". This reflects the fact that, should this buffer overflow and should data be lost, the data is likely to be obtained via a different route such that the data loss is not as critical as in a situation where RN4 is on the only path from RN3 to RN7.

The congestion management may be adjusted accordingly so as to reduce the number of situations where the path information will be re-generated due to the non-critical buffer being congested. In some examples, this can be achieved by using one or more of (a) Increasing the threshold for the non-critical buffer (for comparing with the congestion likelihood) to a higher value than if the buffer is critical. In some examples, the threshold may be set to 100% or higher with a view to avoiding the path information being re-generated as a result of a non-critical buffer being congested.
(b) Limiting the increase for the congestion likelihood for the non-critical buffer. In some examples, any increase may be prevented with a view to avoiding the path information being re-generated as a result of the non-critical buffer being congested. In other words, in the latter case, even if the buffer is identified as being likely to be congested or as currently experiencing congestion, the likelihood of the buffer causing congestion may not be adjusted. From one perspective, this can be seen as ignoring a buffer being close to or being currently overflowing when the buffer is identified as being non-critical.

Accordingly the effect of congestion of non-critical buffers may be limited so as to avoid unnecessary reconfiguration of the network. Safeguards may also be provided such that if both alternative paths (or "if all alternative paths" if more than two alternative paths are available) experience congestion. In this case, one or more buffers or relay nodes may be considered as critical with a view to avoiding having no uncongested path available from a first point to a second point.

Accordingly, by using a monitoring of one or more buffers of relay nodes, the arrangement of the present disclosure can facilitate the reduction of congestion in a network.

Example Methods

Figure 12:
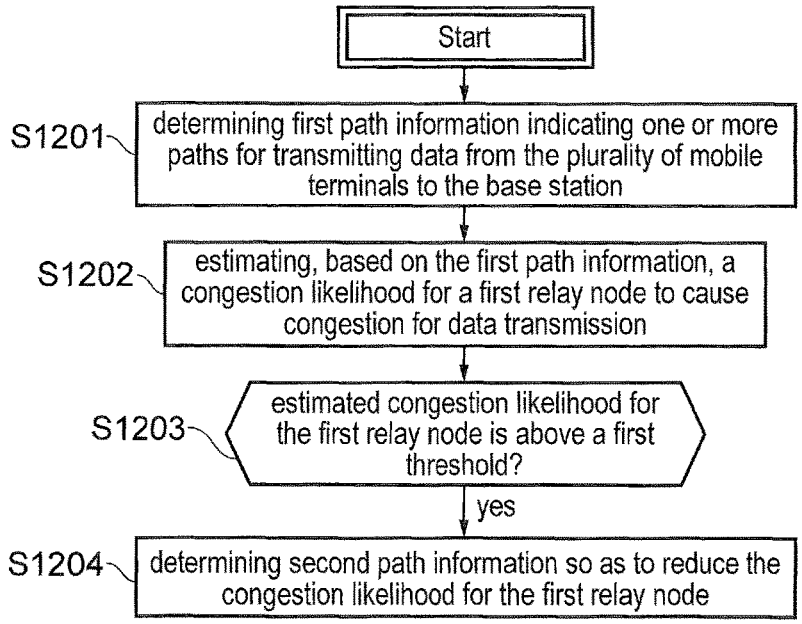
FIG. 12 provides an illustration of an example method of reducing congestion.

Examples methods in accordance with the teachings of the present disclosure will now be discussed. FIG. 12 provides an illustration of an example method of reducing congestion. First, at S1201, first path information indicating one or more paths for transmitting data from the plurality of mobile terminals to the base station is determined. This may for example be determined based on measurement reports obtained from mobile terminals and/or relay node and may involve taking into account one or more of link quality, Signal-to-Interference-plus-Noise Ratio (SINR, also referred to as signal-to-noise-plus-interference ratio "SNIR" sometimes) or any other suitable parameters. For example parameters considered as absolute parameters (e.g. power received, an estimated link capacity, etc.) may be used in addition to or alternatively to parameters considered as relative parameters, such as a relative link quality (e.g. SNIR, a carrier-over-interference measurement).

Then, based on the first path information, a congestion likelihood for a first relay node to cause congestion for data transmission is estimated at S1202. As mentioned above, in some examples this can be based on one or more of number of incoming edges, number of outgoing edges, etc. The discussion above in this respect applies equally here but will not be repeated again, for the sake of brevity.

Then, it is determined whether the estimated congestion likelihood for the first relay node is above a predetermined threshold at S1203. If the likelihood is above a threshold, second path information can be determined at S1204 so as to reduce the congestion likelihood for the first relay node. In some examples, this can be carried out by using the same or similar considerations for estimating the congestion likelihood and for determining the second path information (e.g. looking at a number of terminals served by the relay node). In other examples, the second path information may be determined using different considerations. For example a number of terminals served by the relay node may be taken into account when looking at likelihood of congestion and while the second path information may be determined using link quality, SINR or other type of measurements, wherein a biasing factor is added to artificially reduce the link quality for the first relay node with a view to reducing the resulting load of the first relay node. Also, in some examples, more than one calculation may be carried out for determining the second path information if for example the congestion likelihood for the first relay node has not been reduced or has not been reduced enough.

Accordingly, the path information can be generated which is likely to reduce congestion in the network by detecting potential congestion points and by adjusting the path information so as to reduce the likely amount of traffic going through such potential congestion points.

Figure 13:
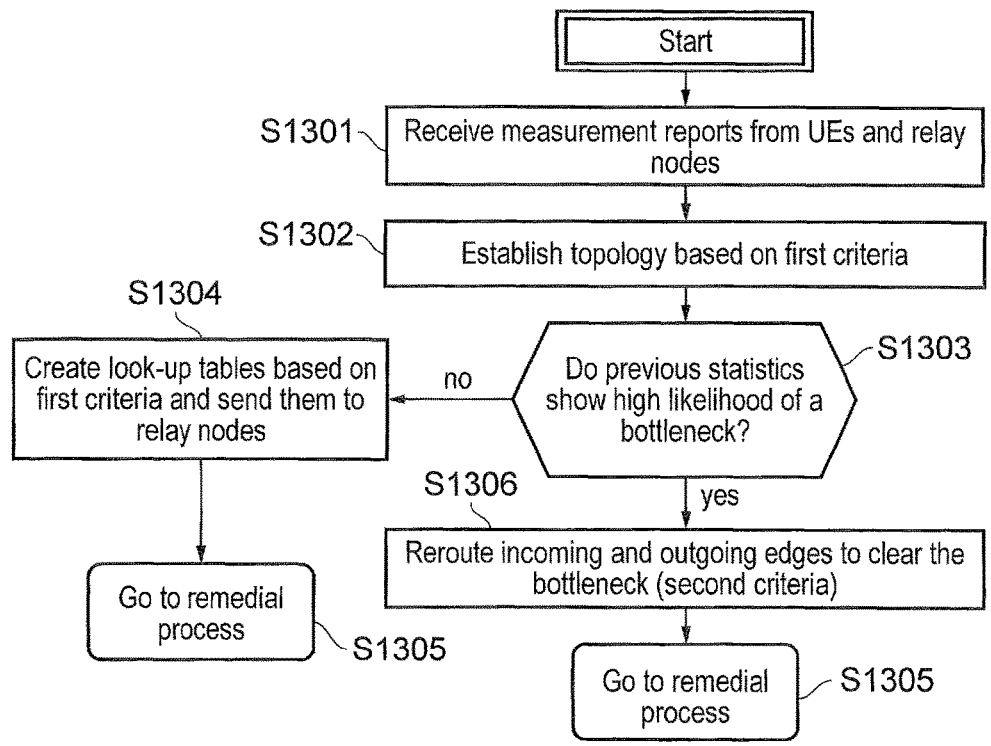
FIG. 13 provides an illustration of another example method of reducing congestion.

FIG. 13 provides an illustration of another example method of reducing congestion for an element, for example the base station, to determine routes within the network with a view to reducing the chances of the network becoming congested. First, at S1301, the base station can receive measurement reports from UEs and relay nodes. Then, at S1302, the base station can establish a topology for routing traffic in the network based on first criteria, for example based on attempt to optimise utilisation of the estimated resources in the network (e.g. using link quality and/or capacity between different elements or nodes of the network). Then, at S1303 it is estimated whether the previous statistics show a high likelihood of this topology creating a bottleneck in the routing of traffic. As mentioned above, the previous statistics may for example be based on previous situations where congestion was found or was not found for one or more relay node in the network.

If no likely bottleneck is identified, the method moves on to S1304 where look-up tables are created based on first criteria and send them to relay nodes. A look-up table is one example of path information or can also be viewed as a representation of the path information in a manner that is more readily usable for the relay nodes routing traffic in the network. A look-up table can for example associate incoming traffic with an outgoing edge so that the relay node can look up in the table which outgoing edge to use for traffic coming from an incoming edge. In some cases the incoming edge can be identified, for example using an identification of the element at the origin of the edge (e.g. a mobile terminal, relay node or base station) and/or in some cases an element further upstream on the path may be identified, for example a terminal or base station at the source of the traffic may be identified and the look-up table can tell the relay node which outgoing edge to use for routing traffic coming from this upstream element. In a case where data from two terminals A and B may be going through relay RN1, then RN2 and data for A should be going to a relay RN3 and data for B to another relay RN4 and where data from a terminal C may be going to RN2 and then a relay RN5, the relay node RN2 may sometimes use only the source of the path (e.g. A, B or C) to route traffic, while in other cases it can use both incoming edges and source of path for routing (e.g. from the edge for C, traffic goes to RN5, from edge from RN1, look at source and for source=A send to RN3 and for source=B send to RN3). Any other suitable way of representing and using the path information may be used for the relay nodes to be able to route incoming traffic onto an outgoing edge. It is noteworthy that whenever it is mentioned that the outgoing edge is identified, this is equivalent to identifying the element at the other end of the outgoing edge. In other words, in some cases an outgoing edge may be identified for the relay node to route the traffic while in other cases, or in combination, a next hop element (e.g. base station, relay node or mobile terminal) may be identified for the relay node to know where to route traffic.

Then, if a remedial process for dealing with congestion in the network is available, the method can move on to the remedial process so as to S1305 onto the remedial process for trying to reduce congestion.

From S1303, if one or more bottlenecks are identified, the method moves to S1306 where one or more incoming and/or outgoing edges of the bottleneck(s) are re-routed with a view to clearing the bottleneck. This can be based on second criteria, for example a number of terminals served by each bottleneck, a buffer's status, etc.

Once some of the expected traffic has been offloaded from the bottleneck(s), the method can then moves on to the remedial process (S1305).

The method of FIG. 13, and more generally a method which can be viewed as acting as a congestion prevention method, may sometimes be carried out when the network is first set up or at any other suitable times, for example whenever an element in the network is added or remover and/or periodically and/or whenever a re-configuration of the routing topology is deemed relevant or desirable.

Figure 14:
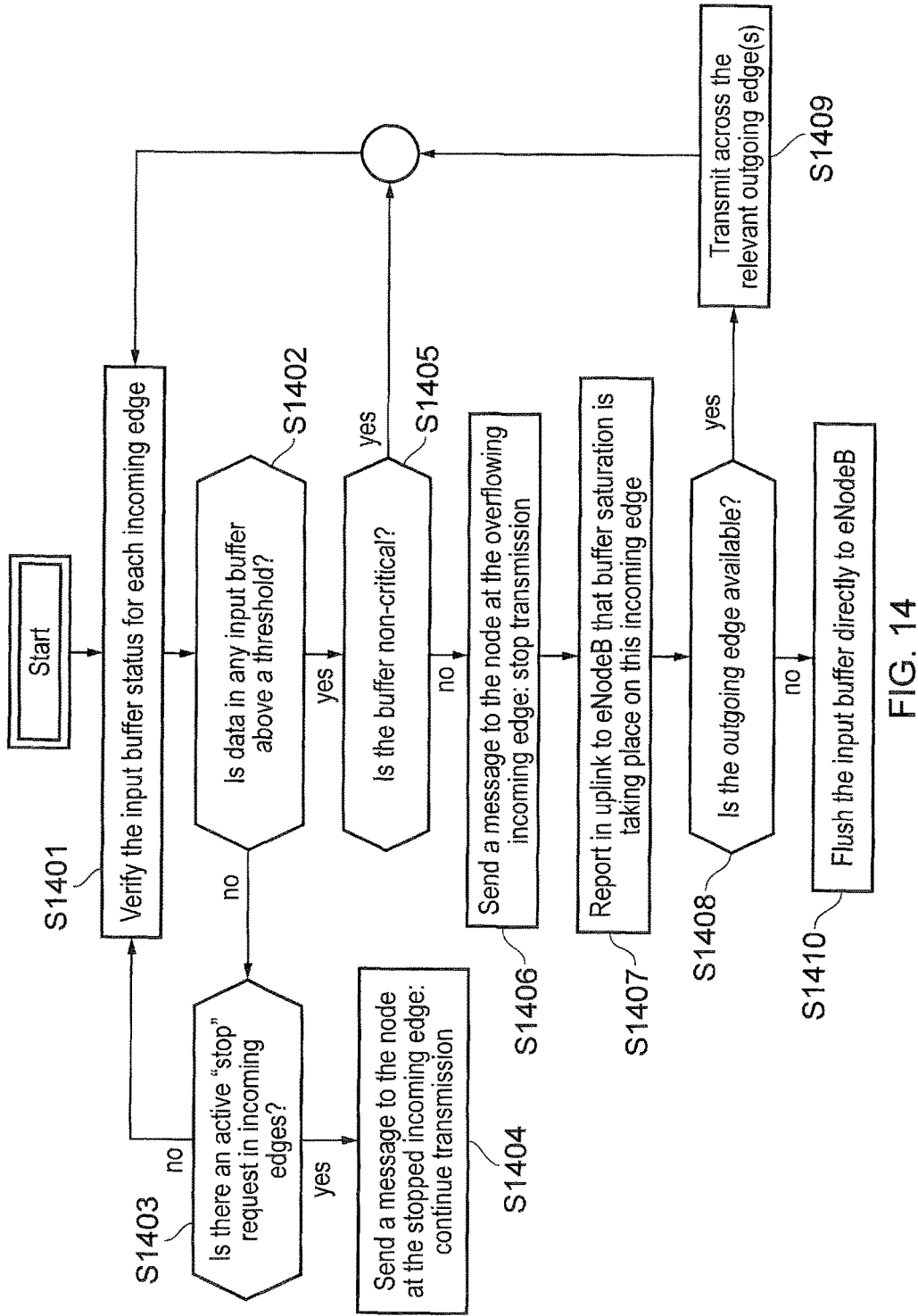
FIG. 14 provides an illustration of a further example method of reducing congestion.

FIG. 14 provides an illustration of a further example method of reducing congestion wherein the method may be carried out by a relay node having, in this example, an input buffer for each incoming edge. The method starts at S1401 where the relay node verifies the input buffer status for each incoming edge. It is then determined at S1402 whether data in any input buffer above a threshold. For example, if any buffer is more than 75%, 80%, 90% or 95% full, this can trigger a "yes" at S1402. If all incoming traffic buffers are below the threshold, the method moves to step S1403 where it is determined whether there is an active "stop" request in incoming edges. For example, the relay may have previously be experiencing congestion and, with a view to addressing this in the short term and with a view to reducing data loss (and possibly at the cost of introducing delay, depending on the topology), the relay node may have then transmitted a "stop" request on one or mode incoming edges with a view to avoiding the corresponding incoming traffic buffer overflowing. If no stop request had previously been sent on the incoming edges are considered as being still active or in place, the method returns to S1401 where the incoming buffers are monitored. On the other hand, if one or more stop requests had been sent and remain active on one or more incoming edges, the method moves to S1404 where the relay node sends a message to the relevant node(s) having previously received the stop request instructing the node(s) to resume transmission. The method may then return to S1401 where the input buffer(s) are monitored. It is noteworthy that, in some cases, a stop request may be associated with a timer such that, when the timer expires, the other node can resume transmission on the incoming edge. In this case, once the timer expires, the stop request is no longer considered as active by the relay node (or the other node).

If however it is determined at S1402 that data in at one (or more) buffer is above a threshold, the method then moves to step S1405 where it is determined whether the buffer is critical or not. Generally, when the critical level of a buffer is estimated, this can be estimated as appropriate and possible methods include for example including whether a buffer and/or edge is critical in or with the path information (e.g. in the form of a look-up table). In other examples, the relay node may determine whether its buffer is critical or not based on the path information it has received. Regardless of the method used, if it is determined that the buffer is non-critical, the method can then return to S1401 where the incoming buffers are monitored. This can be seen as the relay node ignoring a buffer overflowing, or being close to overflowing, in cases where the buffer is considered as non-critical. This can be justified by for example the buffer being considered as non-critical because the data transmitted on the corresponding edge may be obtained or recovered otherwise such that the network is likely to be able to accommodate at least some data loss due to the buffer actually overflowing. In other examples the method can then carry out a step similar to step S1407 discussed below before returning to the monitoring of the incoming buffers.

In the example of FIG. 14, if the buffer is not non-critical the method moves to step S1406. In some cases only two critical levels may be provided "critical" and "non-critical" while in other examples more critical levels may be provided and may possible be represented by an integer or a real number from 0 to L with L≥1. At S1406, the relay node can send a "stop" request on the incoming edge for the buffer to request to other node sending the incoming traffic to stop traffic coming on this incoming edge. As mentioned above, in some cases the stop request may be associated with a timer such that it expires at the end of the timer. Alternatively or additionally, a request may be cancelled when the source of the stop request later send a "resume" request information the relevant node(s) that transmission can be resumed.

The method can then proceed to S1407 where the relay node sends a message to the base station (and/or any other relevant element in the network) to report that the buffer is overflowing or close to overflowing. The report may be called a buffer status report and may include any relevant buffer status information, such as one or more of an indication that the buffer is full or nearly full, an indication that the buffer is nearly full, an indication that the buffer is full, an indication of the fullness of the buffer (e.g. in %), an indication of remaining buffer space (e.g. in % or in memory space), etc. The report may also in some examples include one or more of an identifier for the buffer, an identifier for the relay node, an identifier for the incoming edge (and/or the corresponding node sending the incoming traffic on this edge).

Although steps S1406 and S1407 have been presented in this order in the example of FIG. 14, in some cases they may be carried out in a different order and/or may at least in part overlap (e.g. in some examples they can be carried out substantially simultaneously or contemporaneously).

Returning to the example of FIG. 14, the method then moves to S1408 where it is determined whether the outgoing edge corresponding to the incoming edge/buffer is available. If the edge is available, the method moves to S1409 where the relay node transmit the buffer content to the relevant outgoing edge (or edges if appropriate) and returns to the monitoring of buffers (S1401). On the other hand, if the outgoing edges are not available, the relay node may flush the content of the input buffer directly to base station (S1410). The method can then return to S1401 when the input/incoming buffers are monitored.

Accordingly a relay node may monitor one or more of its buffers with a view to reporting whether an incoming and/or outgoing traffic buffer is saturated (e.g. overflowing or considered as close to overflowing), this can be reported with a view to reducing the expected or actual level of congestion in the network, in particular for this relay node.

Figure 15:
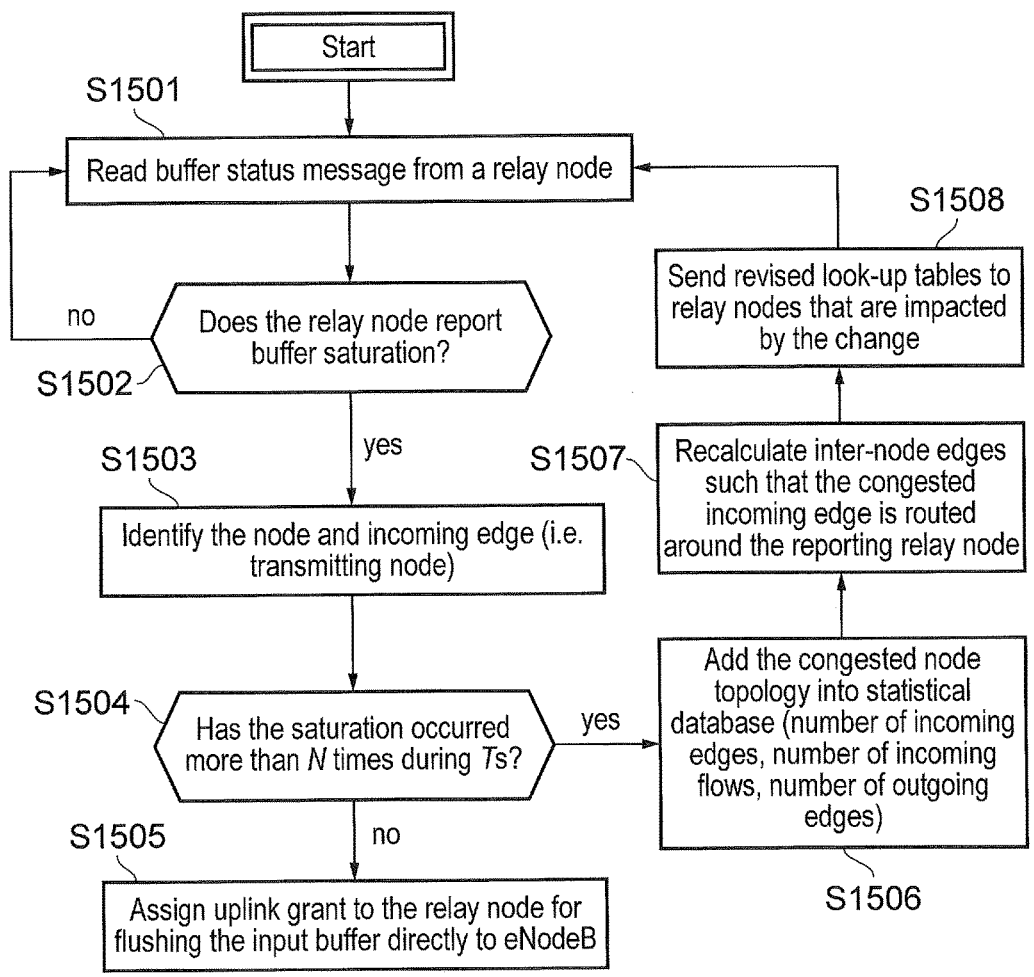
FIG. 15 provides an illustration of yet another example method of reducing congestion.

FIG. 15 provides an illustration of yet another example method of reducing congestion, wherein the method is presented from the perspective of a base station which can receive buffer status reports from one or more relay nodes, although in some examples the method may be carried out by an element different from the base station, and optionally co-located with the base station.

At S1501, the method starts with the base station receiving or reading a buffer status message from a relay node. It is then determined at S1502 wherein it is determined whether the status report is for reporting a buffer saturation. If it is not for reporting buffer saturation, the report may be processed as appropriate (e.g. to build historical and/or statistical data for one or more of the buffer, the relay node and the corresponding edge(s)) and the method returns to S1501 where buffer status reports are being monitored. On the other hand, if the report is for reporting a buffer saturation, the method moves to S1503 where (i) the relay node and (ii) the incoming edge and/or transmitting node for the incoming edge are identified. At S1504, it is estimated whether the saturation has occurred more than S times (S≥1) during a period T (e.g. measured in seconds). This step can help assessing whether there is an ongoing congestion problem at this relay node and/or for this edge or whether the problem is (at this stage) considered as being likely to be an isolated event. If the assessment at S1504 is "no", the method moves to S1505 where the base station can grant uplink resources to the relay node for the node to flush to content of its buffer to the base station with a view to addressing the buffer situation at the relay node. In this case, the relay node can inform fully the contents of the flushed buffer, i.e. which bearers have PDUs included in it. If for example network coding is implemented, the relay node may have data (e.g. PDUs) from one or more source (either at the opposite end of the incoming edge or any upstream source) in its buffer that would have otherwise been combined before sending (directly or indirectly) to the base station. In this case, the relay node may inform the base station which data (e.g. PDUs) would have been combined with other data and/or which incoming edge the data relates to (so that the base station can attempt to identify how they would have been combined). Accordingly, the base station can attempt to recover data based on the network coding configuration for the graph representing the network, if possible. The method can then return to S1501 where buffer status reports are monitored.

If however the assessment at S1504 is "yes", the base station can then attempt to refresh the path information with a view to addressing a congestion situation at the relay node which may then be considered as being an on-going situation rather than an isolated situation. At S1506, the base station can first add the topology information for the congested node into statistical database (including in some examples one or more of: number of incoming edges, number of incoming flows, and number of outgoing edges). The base station can then recalculate inter-node edges such that the congested incoming edge is at least partially routed around the reporting relay node (S1507). In some examples, this may involve routing all of the traffic previously routed via the congested node via one or more different relay node, not including the congested node. In other examples, this may involve routing part of the traffic previously routed via the congested node via one or more different relay node, not including the congested node. For example, if the traffic for a plurality of terminals is routed via the congested node using the same incoming edge, the traffic for some of the terminals may be routed via path not served by the congested node, while the traffic for the remain of the plurality of terminals may still be routed via the congested node, using the same edge that previously experienced congestion.

The method can then move on to step S1508 where the base station sends updated routing information to one or more relay nodes in the network (in some examples, to all relay nodes), wherein the updated routing information—e.g. one or more revised look-up tables—is based on the new path information calculated at S1507. In the example of FIG. 15, the updated routing information sent at S1508 is sent only to the relay nodes that are impacted by the change calculated at S1507, but in other examples, it may be distributed to all relay nodes in the network or to all relay nodes included in the paths identified in the path information. The method can then return to S1501 where the buffer status reports are monitored.

Accordingly, the base station can adjust the topology of the network with a view to avoiding congestion when appropriate, wherein the parameters S and T can be varied with a view to arriving at an arrangement where the topology is not unnecessarily updated for isolated congestion events and where on-going congestion situations are identified and addressed whenever possible.

As the skilled person will understand, in the congestion avoidance scheme of the present disclosure, it cannot be known in advance the amount of traffic that will be sent to or from the terminals or the base station such that it is not possible to anticipate fully what traffic will become in the future. However, by reducing the likelihood for a relay node to cause congestion, the overall congestion in the network can be reduced. Also, if using historical and/or statistical data when determining which paths may be set up with a view to reducing or avoiding congestion, the overall congestion level may be reduced based on an average usage of the network. Also, whenever reference is made to the congestion being reduced in the network, and in view of at least the comment above that the amount and distribution of future cannot be predicted, this should be understood as meaning that the congestion in the network is likely to be reduced.

Also, the congestion avoidance arrangement of the present disclosure may be implemented in any suitable element, for example a stand-alone element (which may be connected to the base station). In some examples, the base station may control the routing and congestion in its network of terminals and relay node assisting transmissions between the terminals and base station.

Also, the arrangement of the present disclosure makes use of the availability of a central entity (sometimes the base station, see above) which can oversee traffic which is generally uplink or downlink, rather than in a conventional meshed network arrangement.

In some examples, the likelihood can for example be expressed in percentages on a scale from 0% to 100%. Any other suitable range may be used (e.g. 0, 1, . . . , n with n≥1), if appropriate.

Also, while the path information identifies paths within the network, routing information may be sent to relay node that only correspond to a subset of the information available in the path information. For example, a relay node may receive routing information in the form of a look-up table which can be defined so that this relay node can route incoming traffic onto the corresponding outgoing edge. In order to do so, the relay may not need to be aware of all paths within the network and may only need to have a limited view on what is incoming and where it should be going out for this particular relay node. Also the path information and/or routing information (e.g. a look-up table) may include information on how to combine data from one or more sources, if for example network coding is implemented. For example, at relay node R4 having three incoming edges from R1 R2 and R3, respectively, and two outgoing edges to R5 and R6, respectively, the path information and the routing information for R3 may indicate that (i) data received from R1 and data received from R2 should be combined and forwarded to relay node R5 while (ii) data coming from R3 can be forwarded to R6. The combining of data may in some examples involve combining data received from two or more PDUs (for the same or different sources) using a XOR operation or a weighted sum operation.

For the sake of brevity, the term "congested node" used herein when referring to the node for which the likelihood of congestion is above the corresponding threshold, regardless of the node actually suffering from congestion or not.

As the skilled person would have understood from the discussion above, the path information may in some examples include more than one path from a mobile terminal to the base station. In some examples data sent from a terminal may be sent as such along a first path and may be sent on another path, combined with data from another terminal, using for example network coding. This may also be considered as an alternative path from this terminal to the base station as, if one of the paths suffers from congestion, the data from the terminal may be recovered using the other path. As a result, buffers along one of or both paths may be considered as being non-critical.

In accordance with the present disclosure, the threshold used for determining whether a relay node is congested or likely to become congested can be the same for all relay nodes in the network, or can be set on a per relay and/or per buffer basis. For example, in some configurations, all critical buffers can start with a base threshold of 80% (which can then be adjusted depending on the relay node and/or buffer) while all non-critical buffers can start with a base threshold of 95% (which can also be adjusted if appropriate).

Also, when estimating the likelihood of congestion, this can be calculated in view of average values within the network. For example, if considering the number of terminals served by a relay node, if all relay nodes but one serve between 10 and 20 terminals but one relay node serves about 100 terminals, this could be used to increase the likelihood of this rely node being a bottleneck and causing congestion. More generally, whenever a type of parameter is discussed for calculating the likelihood of congestion (or the new path information), this parameter may be as an absolute value for the relay node and/or may be used as a relative value (e.g. for the relay node in comparison with other relay nodes within the network).

Moreover, although the use of stop requests has been discussed above when an incoming buffer is detecting a high saturation level, the use of such stop requests is optional and the relay node may report the buffer saturation using a buffer status report and expect the traffic to be re-routed using new path information, if appropriate. In an example, if a stop request is used, the relay nodes may have a means of indicating to the nodes at the opposite end of the incoming edges to slow or stop transmissions, wherein the nodes at the opposite end of these edges can in turn stop transmission and/or propagate the request to the relay nodes in their own incoming edges to avoid buffer overflow. The propagated request may also be a "stop" request or in some examples it may be a "slow" request so as to reduce the amount of traffic sent over the corresponding edge.

In examples where input or incoming buffer status reports are used, the actual signalling of the input buffer status may be carried out as appropriate, using existing signalling mechanisms and/or additional or modified signalling mechanisms. In one example, the relay node may first request uplink resource as a UE and then report in the assigned scheduled resources. In other cases, sending the report may use a different method with a view to avoiding the conventional uplink scheduling request mechanism in mobile networks (using only one bit at a predefined time instant for requesting resources). Depending on the urgency for sending the report, RRC signalling may be sufficient in most cases, where the RRC signalling may be amended or added onto, if necessary, compared to current RRC signalling, for accommodating the buffer status report transport.

Also, as the skilled person will recognise, the teachings of the present disclosure apply equally to traffic on the uplink and on the downlink. Also, while the teachings of the present disclosure have generally been presented for incoming traffic at a relay node, the same teachings apply equally to outgoing traffic (e.g. to an outgoing buffer).

In the present disclosure the terms relay and RN are sometimes used to refer relay nodes. Also, the term infrastructure unit, when used, refers to a base station or any other node between a terminal and a base station, such as a relay node, while the term mobile node refers to a terminal or any other node between a terminal and a base station, such as a relay node. Also, the term relay node as used herein is intended to encompass any mobile terminal or other device which is configured to relay data from a first device to another device in a mobile network. For example, in a device-to-device (D2D) system, a terminal can operate as a relay and assist another terminal with uplink and/or downlink transmissions with a base station. Such a device may then be considered as a relay node when it relays transmissions.

In the present disclosure, the method steps may be carried out in any suitable order. For example, steps may be carried out in an order which differs from those used in the examples discussed above or from those used for listing steps (e.g. in the claims), whenever possible or appropriate. Thus, in some cases, some steps may be carried out in a different order, or simultaneously or in the same order. For example, and as previously mentioned, for each relay node in the measurement set, the detection/discovery, measurement and comparison with a threshold parameter can be carried out all at once for each relay node or may each be carried out for all the relevant relays before moving on to carrying out the next one for each of the relevant relays.

As used herein, transmitting information or a message to an element may involve sending one or more messages to the element and may involve sending part of the information separately from the rest of the information. The number of "messages" involved may also vary depending on the layer or granularity considered.

Also, whenever an aspect is disclosed in respect of an apparatus or system, the teachings are also disclosed for the corresponding method. Likewise, whenever an aspect is disclosed in respect of a method, the teachings are also disclosed for the corresponding apparatus or system.

Whenever the expressions "greater than" or "smaller than" or equivalent are used herein, it is intended that they discloses both alternatives "and equal to" and "and not equal to" unless on alternative is expressly excluded.

It is noteworthy that even though the present disclosure has been discussed in the context of LTE, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard.

Various further aspects and features of the present technique are defined in the appended claims. Various modifications may be made to the embodiments hereinbefore described within the scope of the appended claims. For example although LTE has been presented as an example application, it will be appreciated that other mobile communications systems can be used for which the present technique can be used.

The following numbered clauses define various further aspects and features of the present technique:

Clause 1. A method of reducing congestion in a mobile telecommunications system, the system comprising a plurality of mobile terminals, one or more relay nodes and a base station, the mobile terminals, relay nodes and base station being configured to communicate via a wireless interface, the method comprising:

determining first path information indicating one or more paths for transmitting data from the plurality of mobile terminals to the base station, wherein a path comprises a series of one or more edges, the series of edges being from one or more mobile terminals to the base station, directly or via one or more relay nodes;

estimating, based on the first path information, a congestion likelihood for a first relay node to cause congestion for data transmission in the system; and if the estimated congestion likelihood for the first relay node is above a first threshold, determining second path information so as to reduce the congestion likelihood for the first relay node.

Clause 2. A method according to clause 1, wherein the first path information is determined based on a first type of criteria and wherein the second path information is determined based on a second type of criteria not used for determining the first path information.

Clause 3. A method according to clause 2, wherein the first type of criteria includes at least one of a link capacity, a relative link quality and a signal-to-noise-plus-interference ratio for the available edges in the system.

Clause 4. A method according to clause 2 or 3, wherein the second type of criteria is one of:
the availability of alternative paths for one or more path going through the first node;
the number of incoming edges for the first relay node;
the number of outgoing edges for the first relay node;
an incoming buffer size for the first relay node;
an outgoing buffer size for the first relay node;
a circular buffer size for the first relay node;
historical congestion data for the first relay node;
historical congestion data for the mobile telecommunications system; and
a number of mobile terminals connected to the base station via the first node.

Clause 5. A method according to any preceding clause, wherein the congestion likelihood for the first relay node is determined based on a least one of:
the number of incoming edges for the first relay node;
the number of outgoing edges for the first relay node;
an incoming buffer size for the first relay node;
an outgoing buffer size for the first relay node;
a circular buffer size for the first relay node;
historical congestion data for the first relay node;
historical congestion data for the mobile telecommunications system; and
a number of mobile terminals connected to the base station via the first node.

Clause 6. A method according to any preceding clause, wherein the first relay node is associated with an incoming traffic buffer for an incoming edge of the first relay node and wherein a congestion likelihood is estimated for the incoming traffic buffer of the first node.

Clause 7. A method according to clause 6, wherein the incoming traffic buffer is associated with a critical level, the critical level being based on the availability of one or more alternative path to the path which corresponds to the incoming edge of the first incoming edge buffer.

Clause 8. A method according to clause 7 wherein the congestion likelihood for the first incoming edge buffer is compared to a corresponding threshold which is set based on the critical level for the incoming edge buffer.

Clause 9. A method according to clause 7 or 8, wherein, upon receipt of a message that the available capacity of a first incoming edge buffer of the first relay node is below a certain capacity threshold, determining whether to increase the estimated congestion likelihood for the incoming buffer edge buffer based on the critical level for the incoming edge buffer.

Clause 10. A method according to any preceding clause, the method comprising:

transmitting routing information to a corresponding relay node, wherein the routing information is based on the second path information and provides information for the corresponding relay node to route incoming traffic onto an outgoing edge in accordance with the second path information.

Clause 11. A method according to any preceding clause, the method comprising:

transmitting first routing information to a selected relay node, wherein the first routing information is based on the first path information and provides information for the selected relay node to route incoming traffic onto an outgoing edge in accordance with the first path information;

upon determining the second path information, determining whether the routing for the selected relay node is affected by the change from the first path information to the second path information; and if it is determined that the routing for the selected relay node is affected, transmitting second routing information to the selected relay node, wherein the second routing information provides information for the selected relay node to route incoming traffic onto an outgoing edge in accordance with the second path information.

Clause 12. A method according to any preceding clause wherein determining second path information comprises:

determining whether, for a first path from a mobile station to the base station and via the first relay node according to the first path information, an alternative path is available from the mobile station to the base station and not via the first relay node; and replacing the first path with the alternative path.

Clause 13. A method according to any preceding clause, wherein at least one relay node is a mobile terminal configured to operate as a relay node.

Clause 14. A base station for reducing congestion in a mobile telecommunications system, the system comprising a plurality of mobile terminals, one or more relay nodes and a base station, the mobile terminals, relay nodes and base station being configured to communicate via a wireless interface, wherein the base station is configured to:

determine first path information indicating one or more paths for transmitting data from the plurality of mobile terminals to the base station, wherein a path comprises a series of one or more edges, the series of edges being from one or more mobile terminals to the base station, directly or via one or more relay nodes;

estimate, based on the first path information, a congestion likelihood for a first relay node to cause congestion for data transmission in the system; and if the estimated congestion likelihood for the first relay node is above a first threshold, determine second path information so as to reduce the congestion likelihood for the first relay node.

Clause 15. A base station for reducing congestion in a mobile telecommunications system, the system comprising a plurality of mobile terminals, one or more relay nodes and a base station, the mobile terminals, relay nodes and base station being configured to communicate via a wireless interface, wherein the base station is configured to carry out the method of any of clauses 1 to 13.

Clause 16. Circuitry for reducing congestion in a mobile telecommunications system, the system comprising a plurality of mobile terminals, one or more relay nodes and a base station, the mobile terminals, relay nodes and base station being configured to communicate via a wireless interface, wherein the circuitry comprises a controller element and a transceiver element configured to operate together to:

determine first path information indicating one or more paths for transmitting data from the plurality of mobile terminals to the base station, wherein a path comprises a series of one or more edges, the series of edges being from one or more mobile terminals to the base station, directly or via one or more relay nodes;

estimate, based on the first path information, a congestion likelihood for a first relay node to cause congestion for data transmission in the system; and if the estimated congestion likelihood for the first relay node is above a first threshold, determine second path information so as to reduce the congestion likelihood for the first relay node.

Clause 17. A relay node for reducing congestion in a mobile telecommunications system, the system comprising a plurality of mobile terminals, one or more relay nodes and a base station, the mobile terminals, relay nodes and base station being configured to communicate via a wireless interface, wherein the relay node is configured to:

determine that a first buffer of the relay has a saturation level above a maximum saturation threshold;

transmit, upon the determination, a buffer status report indicating that the first buffer has a high saturation level;

receive routing information, the routing information providing information for the relay node to route incoming traffic onto an outgoing edge; and route incoming traffic in accordance with the routing information received.

Clause 18. A relay node according to clause 1717, wherein the relay node is configured to:

determined a critical level for the first buffer; and based on the critical level for the first buffer, carry out at least one of:

increase the maximum saturation threshold;

ignore a saturation level above a maximum threshold.

Clause 19. A relay node according to clause 17 or 18, wherein the relay node is configured to:

upon determination that the saturation level for the first buffer is above the maximum saturation threshold, sending a stop request to one or more nodes transmitting traffic received via the first buffer, the stop request requesting the one or more nodes to stop transmitting to the first relay node.

Clause 20. Circuitry for a relay node for reducing congestion in a mobile telecommunications system, the system comprising a plurality of mobile terminals, one or more relay nodes and a base station, the mobile terminals, relay nodes and base station being configured to communicate via a wireless interface, wherein the circuitry comprises a controller element and a transceiver element configured to operate together to:

determine that a first buffer of the relay has a saturation level above a maximum saturation threshold;

transmit, upon the determination, a buffer status report indicating that the first buffer has a high saturation level;

receive routing information, the routing information providing information for the relay node to route incoming traffic onto an outgoing edge; and route incoming traffic in accordance with the routing information received.

REFERENCES

[1] Holma H. and Toskala A., "LTE for UMTS OFDMA and SC-FDMA Based Radio Access", John Wiley & Sons Limited, January 2010.

The invention claimed is:

1. A method of reducing congestion in a mobile telecommunications system, the system comprising a plurality of mobile terminals, one or more relay nodes and a base station, the mobile terminals, relay nodes and base station being configured to communicate via a wireless interface, the method comprising:
   determining first path information based on buffer saturation information accessed before congestion occurs, the first path information indicating one or more paths for transmitting data from the plurality of mobile terminals to the base station, wherein a path comprises a series of one or more edges, the series of edges being from one or more mobile terminals to the base station, directly or via one or more relay nodes;
   estimating, based on the first path information, a congestion likelihood for a first relay node to cause congestion for data transmission in the system; and
   if the estimated congestion likelihood for the first relay node is above a first threshold, determining second path information so as to reduce the congestion likelihood for the first relay node before congestion occurs.

2. A method according to claim 1, wherein the first path information is determined based on a first type of criteria and wherein the second path information is determined based on a second type of criteria not used for determining the first path information.

3. A method according to claim 2, wherein the first type of criteria includes, for the available edges in the system, at least one of a link capacity, a relative link quality and a signal-to-noise-plus-interference ratio.

4. A method according to claim 2, wherein the second type of criteria is one of:
   an availability of alternative paths for one or more paths going through the first node;
   a number of incoming edges for the first relay node;
   a number of outgoing edges for the first relay node;
   an incoming buffer size for the first relay node;
   an outgoing buffer size for the first relay node;
   a circular buffer size for the first relay node;
   historical congestion data for the first relay node;
   historical congestion data for the mobile telecommunications system; and
   a number of mobile terminals connected to the base station via the first node.

5. A method according to claim 1, wherein the congestion likelihood for the first relay node is determined based on a least one of:
   a number of incoming edges for the first relay node;
   a number of outgoing edges for the first relay node;
   an incoming buffer size for the first relay node;
   an outgoing buffer size for the first relay node;
   a circular buffer size for the first relay node;
   historical congestion data for the first relay node;
   historical congestion data for the mobile telecommunications system; and
   a number of mobile terminals connected to the base station via the first node.

6. A method according to claim 1, wherein the first relay node is associated with an incoming traffic buffer for an incoming edge of the first relay node and wherein a congestion likelihood is estimated for the incoming traffic buffer of the first node.

7. A method according to claim 6, wherein the incoming traffic buffer is associated with a critical level, the critical level being based on the availability of one or more alternative path to the path which corresponds to the incoming edge of the first incoming edge buffer.

8. A method according to claim 7 wherein the congestion likelihood for the first incoming edge buffer is compared to a corresponding threshold which is set based on the critical level for the incoming edge buffer.

9. A method according to claim 7, wherein, upon receipt of a message that the available capacity of a first incoming edge buffer of the first relay node is below a certain capacity threshold, determining whether to increase the estimated congestion likelihood for the incoming buffer edge buffer based on the critical level for the incoming edge buffer.

10. A method according to claim 1, the method comprising:
    transmitting routing information to a corresponding relay node, wherein the routing information is based on the second path information and provides information for the corresponding relay node to route incoming traffic onto an outgoing edge in accordance with the second path information.

11. A method according to claim 1, the method comprising:
    transmitting first routing information to a selected relay node, wherein the first routing information is based on the first path information and provides information for the selected relay node to route incoming traffic onto an outgoing edge in accordance with the first path information;
    upon determining the second path information, determining whether the routing for the selected relay node is affected by the change from the first path information to the second path information; and
    if it is determined that the routing for the selected relay node is affected, transmitting second routing information to the selected relay node, wherein the second routing information provides information for the selected relay node to route incoming traffic onto an outgoing edge in accordance with the second path information.

12. A method according to claim 1, wherein determining second path information comprises:
    determining whether, for a first path from a mobile station to the base station and via the first relay node according to the first path information, an alternative path is available from the mobile station to the base station and not via the first relay node; and
    replacing the first path with the alternative path.

13. A method according to claim 1, wherein at least one relay node is a mobile terminal configured to operate as a relay node.

14. Circuitry for reducing congestion in a mobile telecommunications system, the system comprising a plurality of mobile terminals, one or more relay nodes and a base station, the mobile terminals, relay nodes and base station being configured to communicate via a wireless interface, wherein the circuitry comprises a controller element and a transceiver element configured to operate together to:
    determine first path information based on buffer saturation information accessed before congestion occurs, the first path information indicating one or more paths for transmitting data from the plurality of mobile terminals to the base station, wherein a path comprises a series of one or more edges, the series of edges being from one or more mobile terminals to the base station, directly or via one or more relay nodes;

estimate, based on the first path information, a congestion likelihood for a first relay node to cause congestion for data transmission in the system; and if the estimated congestion likelihood for the first relay node is above a first threshold, determine second path information so as to reduce the congestion likelihood for the first relay node before congestion occurs.

15. A relay node for reducing congestion in a mobile telecommunications system, the system comprising a plurality of mobile terminals, one or more relay nodes and a base station, the mobile terminals, relay nodes and base station being configured to communicate via a wireless interface, wherein the relay node is configured to:

determine that a first buffer of the relay has a saturation level above a maximum saturation threshold;

transmit, upon the determination, a buffer status report indicating that the first buffer has a high saturation level;

receive routing information, the routing information providing information for the relay node to route incoming traffic onto an outgoing edge; and route incoming traffic in accordance with the routing information received.

16. A relay node according to claim 15, wherein the relay node is configured to:

determine a critical level for the first buffer; and based on the critical level for the first buffer, carry out at least one of:

increase the maximum saturation threshold; and ignore a saturation level above a maximum threshold.

17. A relay node according to claim 15, wherein the relay node is configured to:

upon determination that the saturation level for the first buffer is above the maximum saturation threshold, sending a stop request to one or more nodes transmitting traffic received via the first buffer, the stop request requesting the one or more nodes to stop transmitting to the first relay node.

* * * * *